United States Patent
Shen

(10) Patent No.: US 7,437,404 B2
(45) Date of Patent: Oct. 14, 2008

(54) SYSTEM AND METHOD FOR IMPROVING EQUIPMENT COMMUNICATION IN SEMICONDUCTOR MANUFACTURING EQUIPMENT

(75) Inventor: Hsueh Chi Shen, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 868 days.

(21) Appl. No.: 10/851,592

(22) Filed: May 20, 2004

(65) Prior Publication Data

US 2005/0261796 A1    Nov. 24, 2005

(51) Int. Cl.
G06F 15/16 (2006.01)
(52) U.S. Cl. .................... 709/202; 709/226; 709/229
(58) Field of Classification Search ............... 709/234, 709/216, 202, 203, 204, 226, 229; 370/411–419; 700/121, 119, 117; 718/1, 100
See application file for complete search history.

(56) References Cited

U.S. PATENT DOCUMENTS

| | | | |
|---|---|---|---|
| 5,610,903 A | 3/1997 | Crayford | |
| 5,859,964 A | 1/1999 | Wang et al. | |
| 6,018,808 A | 1/2000 | Schieve | |
| 6,133,132 A | 10/2000 | Toprac et al. | |
| 6,212,165 B1* | 4/2001 | Mann et al. | 370/231 |
| 6,245,581 B1 | 6/2001 | Bosner et al. | |
| 6,263,255 B1 | 7/2001 | Tan et al. | |
| 6,294,472 B1 | 9/2001 | Smith et al. | |
| 6,304,999 B1* | 10/2001 | Toprac et al. | 716/4 |
| 6,335,286 B1 | 1/2002 | Lansford | |
| 6,337,217 B1 | 1/2002 | Hause et al. | |
| 6,346,426 B1 | 2/2002 | Toprac et al. | |
| 6,352,870 B1 | 3/2002 | Lansford | |
| 6,360,133 B1* | 3/2002 | Campbell et al. | 700/115 |
| 6,362,116 B1 | 3/2002 | Lansford | |
| 6,365,422 B1 | 4/2002 | Hewett et al. | |
| 6,368,184 B1 | 4/2002 | Beckage | |
| 6,368,883 B1 | 4/2002 | Bode et al. | |
| 6,368,884 B1 | 4/2002 | Goodwin et al. | |
| 6,376,261 B1 | 4/2002 | Campbell | |

(Continued)

OTHER PUBLICATIONS

Codd Jr., "Architecture for Automated Large Scale Fault Detection and Classification: A Breakthrough Design", Nov. 14, 2002; 12 pgs., Advanced Micro Devices, Inc.

(Continued)

*Primary Examiner*—Saleh Najjar
*Assistant Examiner*—Waseem Ashraf
(74) *Attorney, Agent, or Firm*—Haynes Boone, LLP

(57) ABSTRACT

Provided is a system and method for connecting semiconductor manufacturing equipment to a host and one or more clients. In one example, the system includes an application queue, a host queue, and an equipment queue configured to hold messages received from and sent to an application agent, a host agent, and an equipment agent, respectively. A management information base may be configured to store information identifying a first virtual channel linking the client with the manufacturing equipment via the application queue and the equipment queue, and a second virtual channel linking the host with the manufacturing equipment via the host queue and the equipment queue. A dispatcher may be configured to use information from the management information base to route messages between the client and the manufacturing equipment via the first virtual channel and to route messages between the host and the manufacturing equipment via the second virtual channel.

18 Claims, 4 Drawing Sheets

U.S. PATENT DOCUMENTS

| | | |
|---|---|---|
| 6,383,824 B1 | 5/2002 | Lensing |
| 6,383,888 B1 | 5/2002 | Stirton |
| 6,387,823 B1 | 5/2002 | Sonderman et al. |
| 6,405,096 B1 | 6/2002 | Toprac et al. |
| 6,405,144 B1 | 6/2002 | Toprac et al. |
| 6,409,879 B1 | 6/2002 | Toprac et al. |
| 6,410,351 B1 | 6/2002 | Bode et al. |
| 6,427,093 B1 | 7/2002 | Toprac |
| 6,442,496 B1 | 8/2002 | Pasadyn et al. |
| 6,444,481 B1 | 9/2002 | Pasadyn et al. |
| 6,448,099 B1 | 9/2002 | Iacoponi et al. |
| 6,449,524 B1 | 9/2002 | Miller et al. |
| 6,451,700 B1 | 9/2002 | Stirton et al. |
| 6,458,605 B1 | 10/2002 | Stirton |
| 6,458,610 B1 | 10/2002 | Lensing et al. |
| 6,460,002 B1 | 10/2002 | Bone et al. |
| 6,461,878 B1 | 10/2002 | Lansford |
| 6,465,263 B1 | 10/2002 | Coss, Jr. et al. |
| 6,470,230 B1 | 10/2002 | Toprac et al. |
| 6,479,200 B1 | 11/2002 | Stirton |
| 6,479,309 B1 | 11/2002 | Wright |
| 6,480,854 B1 | 11/2002 | Gross et al. |
| 6,484,064 B1 | 11/2002 | Campbell |
| 6,485,990 B1 | 11/2002 | Lansford |
| 6,486,036 B1 | 11/2002 | Miethke et al. |
| 6,509,201 B1 | 1/2003 | Wright |
| 6,511,898 B1 | 1/2003 | Sonderman et al. |
| 6,512,991 B1 | 1/2003 | Davis et al. |
| 6,524,163 B1 | 2/2003 | Stirton |
| 6,524,774 B1 | 2/2003 | Sonderman |
| 6,528,331 B1 | 3/2003 | Bode et al. |
| 6,529,282 B1 | 3/2003 | Stirton et al. |
| 6,529,789 B1 | 3/2003 | Campbell et al. |
| 6,532,428 B1 | 3/2003 | Toprac |
| 6,532,555 B1 | 3/2003 | Miller et al. |
| 6,534,328 B1 | 3/2003 | Hewett et al. |
| 6,535,774 B1 | 3/2003 | Bode et al. |
| 6,535,783 B1 | 3/2003 | Miller et al. |
| 6,546,508 B1 * | 4/2003 | Sonderman et al. ........... 714/48 |
| 6,549,822 B1 | 4/2003 | Toprac |
| 6,556,881 B1 | 4/2003 | Miller |
| 6,556,882 B1 | 4/2003 | Conboy et al. |
| 6,556,884 B1 | 4/2003 | Miller et al. |
| 6,556,959 B1 | 4/2003 | Miller et al. |
| 6,560,503 B1 | 5/2003 | Toprac et al. |
| 6,560,506 B2 | 5/2003 | Toprac et al. |
| 6,562,635 B1 | 5/2003 | Lensing et al. |
| 6,563,300 B1 | 5/2003 | Jackson et al. |
| 6,567,718 B1 | 5/2003 | Campbell et al. |
| 6,569,692 B1 | 5/2003 | Bode et al. |
| 6,570,228 B1 | 5/2003 | Fuselier et al. |
| 6,571,371 B1 | 5/2003 | Coss, Jr. et al. |
| 6,576,385 B2 | 6/2003 | Bode et al. |
| 6,577,914 B1 | 6/2003 | Bode |
| 6,582,618 B1 | 6/2003 | Toprac et al. |
| 6,582,863 B1 | 6/2003 | Stirton et al. |
| 6,582,975 B1 | 6/2003 | Ryskoski |
| 6,588,007 B1 | 7/2003 | Pasadyn et al. |
| 6,589,875 B1 | 7/2003 | Bode et al. |
| 6,593,227 B1 | 7/2003 | Ryskoski |
| 6,594,589 B1 | 7/2003 | Coss, Jr. et al. |
| 6,595,830 B1 | 7/2003 | Hewett et al. |
| 6,597,447 B1 | 7/2003 | Stirton et al. |
| 6,599,174 B1 | 7/2003 | Spikes, Jr. |
| 6,605,479 B1 | 8/2003 | Pasadyn et al. |
| 6,607,926 B1 | 8/2003 | Toprac et al. |
| 6,610,181 B1 | 8/2003 | Besser et al. |
| 6,614,540 B1 | 9/2003 | Stirton et al. |
| 6,615,098 B1 | 9/2003 | Bode et al. |
| 6,617,258 B1 | 9/2003 | Sonderman et al. |
| 6,618,149 B1 | 9/2003 | Stirton |
| 6,618,640 B1 | 9/2003 | Hittner et al. |
| 6,622,059 B1 | 9/2003 | Toprac et al. |
| 6,622,061 B1 | 9/2003 | Toprac et al. |
| 6,625,512 B1 | 9/2003 | Goodwin |
| 6,625,514 B1 | 9/2003 | Lensing |
| 6,629,012 B1 | 9/2003 | Riley et al. |
| 6,629,879 B1 | 10/2003 | Kim et al. |
| 6,630,360 B2 | 10/2003 | Christian et al. |
| 6,630,362 B1 | 10/2003 | Lensing |
| 6,631,406 B1 * | 10/2003 | Pantages et al. ............. 709/223 |
| 6,632,692 B1 | 10/2003 | Hewett et al. |
| 6,640,148 B1 | 10/2003 | Miller et al. |
| 6,643,008 B1 | 11/2003 | Stirton et al. |
| 6,643,557 B1 | 11/2003 | Miller et al. |
| 6,645,780 B1 | 11/2003 | Sonderman et al. |
| 6,647,309 B1 | 11/2003 | Bone |
| 6,650,423 B1 | 11/2003 | Markle et al. |
| 6,650,957 B1 | 11/2003 | Campbell et al. |
| 6,657,716 B1 | 12/2003 | Lensing et al. |
| 6,660,539 B1 | 12/2003 | Sonderman et al. |
| 6,660,542 B1 | 12/2003 | Stirton |
| 6,660,543 B1 | 12/2003 | Stirton et al. |
| 6,660,651 B1 | 12/2003 | Markle |
| 6,664,013 B1 | 12/2003 | Hewett et al. |
| 6,665,623 B1 | 12/2003 | Pasadyn et al. |
| 6,666,754 B1 | 12/2003 | Beckage |
| 6,675,058 B1 | 1/2004 | Pasadyn et al. |
| 6,677,170 B1 | 1/2004 | Markle |
| 6,678,570 B1 | 1/2004 | Pasadyn et al. |
| 6,684,122 B1 | 1/2004 | Christian et al. |
| 6,687,561 B1 | 2/2004 | Pasadyn et al. |
| 6,689,521 B1 | 2/2004 | Goodwin |
| 6,697,153 B1 | 2/2004 | Wright et al. |
| 6,697,691 B1 | 2/2004 | Miller et al. |
| 6,697,696 B1 | 2/2004 | Hickey et al. |
| 6,698,009 B1 | 2/2004 | Pasadyn et al. |
| 6,699,727 B1 | 3/2004 | Toprac et al. |
| 6,701,206 B1 | 3/2004 | Markle et al. |
| 6,706,631 B1 | 3/2004 | Fulford |
| 6,707,562 B1 | 3/2004 | Lensing |
| 6,708,129 B1 | 3/2004 | Pasadyn et al. |
| 6,709,797 B1 | 3/2004 | Bushman et al. |
| 6,716,646 B1 | 4/2004 | Wright et al. |
| 6,721,616 B1 | 4/2004 | Ryskoski |
| 6,725,121 B1 | 4/2004 | Pasadyn et al. |
| 6,725,402 B1 | 4/2004 | Coss, Jr. et al. |
| 6,834,213 B1 * | 12/2004 | Sonderman et al. ......... 700/121 |
| 7,010,586 B1 * | 3/2006 | Allavarpu et al. ........... 709/233 |
| 7,099,947 B1 * | 8/2006 | Nadeau et al. .............. 709/229 |

OTHER PUBLICATIONS

Ken Lee, SmartSys Overview, SmartSys, Aug. 1, 2002, 25 pages, Applied Materials, Taiwan.

SBSS "Overview Manual Introduction", Version 6.0.0, Feb. 2004, www.siautomation.com.

Goodlin, Brian E., et al., "Simultaneous Fault Detection and Classification for Semiconductor Manufacturing Tools", 201st Meeting of the Electrochemical Society, International Symposium on Plasma Processing XIV, May 2002, 16 pages.

* cited by examiner

SYSTEM AND METHOD FOR IMPROVING EQUIPMENT COMMUNICATION IN SEMICONDUCTOR MANUFACTURING EQUIPMENT

CROSS-REFERENCE

This application is related to U.S. patent application Ser. No. 10/831,064, filed on Apr. 23, 2004, and entitled "SYSTEM AND METHOD FOR REAL-TIME FAULT DETECTION, CLASSIFICATION, AND CORRECTION IN A SEMICONDUCTOR MANUFACTURING ENVIRONMENT."

TECHNICAL FIELD

The present disclosure relates generally to a system and method for improving communication in a semiconductor product manufacturing facility and, more specifically, to a system and method for connecting manufacturing equipment to a plurality of clients.

BACKGROUND

In a semiconductor manufacturing business such as a semiconductor foundry business, manufacturing equipment may be controlled by a host. If other tools or processes, such as fault detection and classification (FDC) tools or advanced process control (APC) systems, are to be connected to the manufacturing equipment, they may be positioned in a critical path between the manufacturing equipment and the host. However, if the tools malfunction or fail, the critical path between the host and the manufacturing equipment may be compromised.

Accordingly, what is needed in the art is a system and method thereof that addresses the above discussed issues.

DETAILED DESCRIPTION

Figure 1:
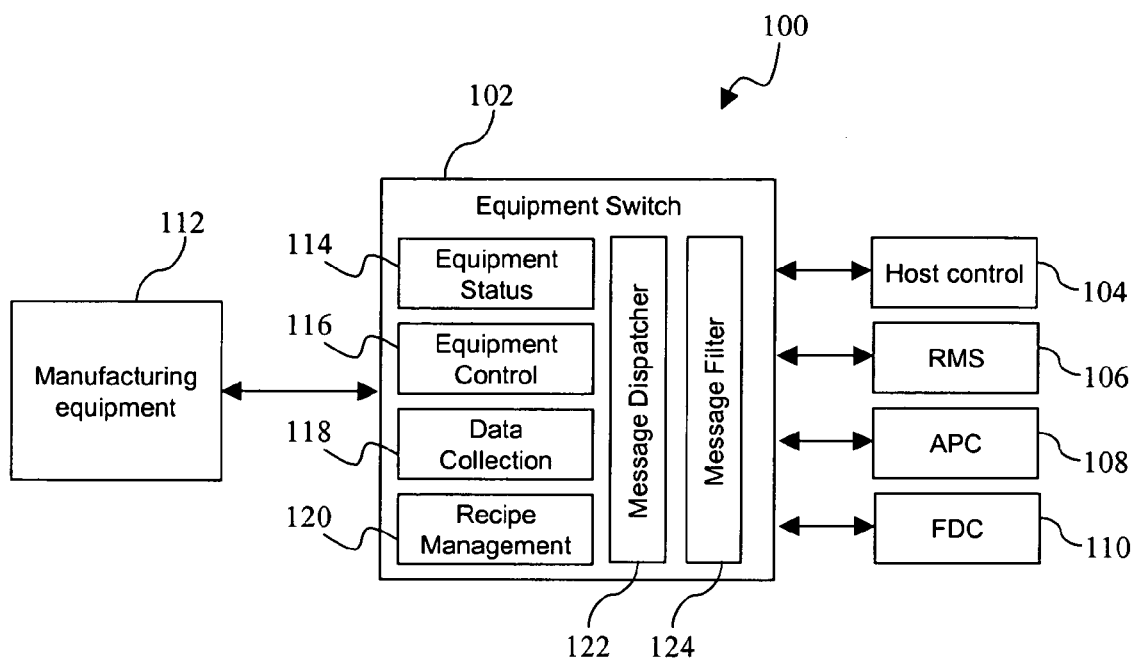
FIG. 1 illustrates a schematic view of one embodiment of a system for simultaneously connecting manufacturing equipment with multiple clients.

The present disclosure relates generally to a system and method for improving communication in a semiconductor product manufacturing facility and, more specifically, to a system and method for connecting manufacturing equipment to a plurality of clients. It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, an exemplary semiconductor manufacturing environment 100 includes an equipment switch 102 that may be positioned between multiple clients 104, 106, 108, 110 and manufacturing equipment 112. The equipment switch 102 may communicate with the clients 104-110 and manufacturing equipment 112 using standards such as the Semiconductor Equipment Communication Standard (SECS), Generic Model for Communications and Control of SEMI (Semiconductor Equipment and Materials International) Equipment (GEM) and/or High Speed Message Service (HSMS).

Each of the clients 104-110 may include processes and/or equipment (e.g., diagnostics or control equipment), one or more databases, or any other software or hardware components that may be used in a semiconductor manufacturing environment. For purposes of example, the client 104 includes a host control process that may be used to control the manufacturing equipment 112, the client 106 includes a recipe management system (RMS) process, client 108 includes an advanced process control (APC) process, and the client 110 includes a fault detection and classification (FDC) process. It is understood that each of the processes may be stored, controlled, and/or executed on one or more computers or other pieces of equipment (not shown). Furthermore, each of the clients 104-110 may communicate with the equipment switch 102 using one or more protocols that may be different from the protocols used by the other clients.

The equipment switch 102 may include multiple processes. These processes may be resident within the switch itself, or may be stored or controlled outside the switch while using the switch to communicate with the clients 104-110 and manufacturing equipment 112. For purposes of example, the equipment switch 102 includes an equipment status process 114, an equipment control process 116, a data collection process 118, and a recipe management process 120. It is understood that each process may be associated with one or more memories for purposes such as instruction storage, data storage, etc. One or more of the memories may include a database or may be structured in any other manner to facilitate data storage and retrieval.

The equipment status process 114 may receive and store information regarding equipment status from the manufacturing equipment 112. The equipment control process 116 may be used to control the manufacturing equipment 112 using, for example, instructions received from the host control process 104. The data collection process 118 may collect, store, and/or analyze data received from the manufacturing equipment 112. This may enable optimizations or other improvements to be made to the manufacturing equipment 112, as well as provide long term data to monitor maintenance intervals. The recipe management process 120 may use data obtained from the RMS process 106 to provide recipe data to the manufacturing equipment 112.

The equipment switch 102 may also include a message dispatcher 122 and a filter 124. The messages arriving from the clients 104-110 may be identified by the filter and directed by the dispatcher to one of the processes 114-120. For example, if all messages are received from the clients via a single network connection, the message filter 124 may provide packet filtering services that identify the destination of each message as one of the processes 114-120. The dispatcher 122 may then direct each message to the appropriate process. Similarly, the message dispatcher 122 may transfer messages from the processes to the message filter 124, which may identify the client for which each message is intended and may route the message to the appropriate client.

It is understood that various components of the equipment switch 102 are illustrated for purposes of example only, and that changes may be made to the components, their placement, and their functionality. For example, multiple message filters may be used, the illustrated message filter may be placed in a different location, the various processes 114-120 may be combined or further divided, and other changes may be made. In addition, each component may be implemented in many ways.

It is understood that the equipment switch 102 embodies any system that may be used to achieve the described functionality, and may be a physical device positioned between the manufacturing equipment 112 and the clients 104-110, or may be one or more software components stored and executed on one or more devices (e.g., the clients 104-110). For example, functionality provided by the equipment switch 102 may be placed within the host containing the host control process 104, or may be distributed among multiple devices in the form of hardware and/or software components. Accordingly, the term "equipment switch" as used in the following disclosure may refer to any combination of hardware and/or software that may be distributed or may be implemented as a single unit to achieve the described functionality.

Figure 2:
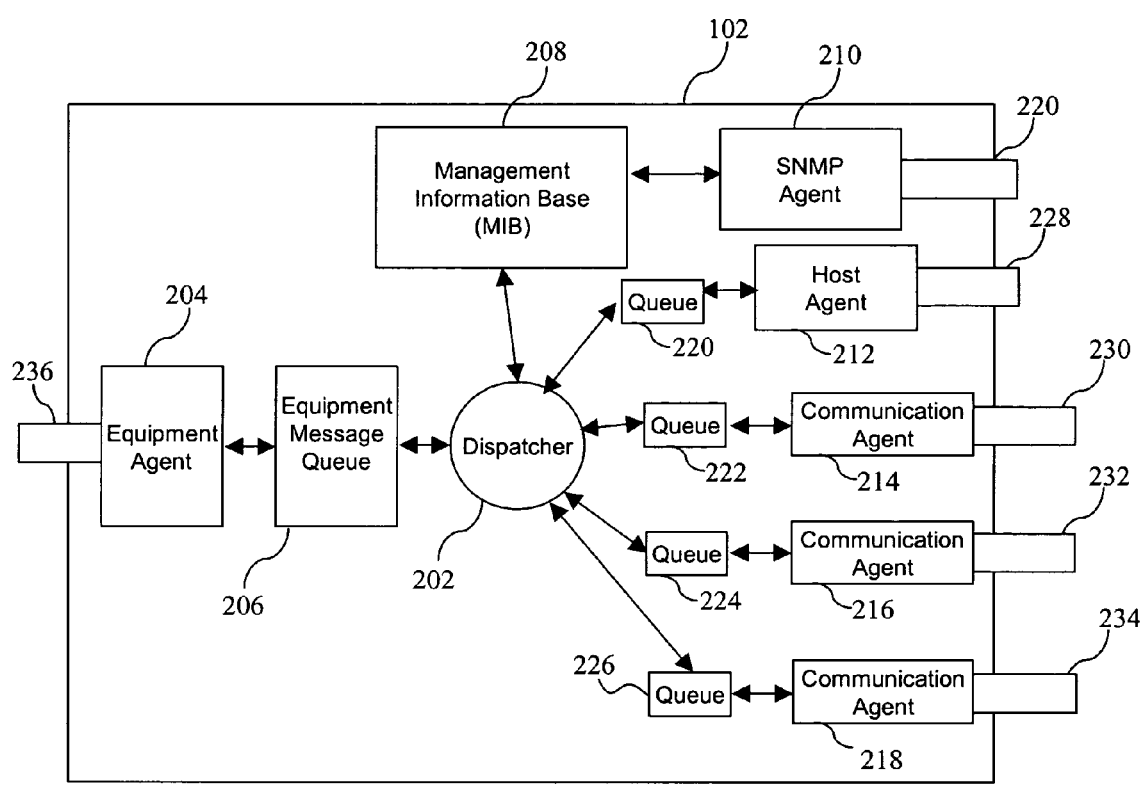
FIG. 2 illustrates a schematic view of an exemplary architecture that may be used within the system of FIG. 1.

Referring now to FIG. 2, one embodiment of an exemplary architecture that may be used in an equipment switch (e.g., the equipment switch 102 of FIG. 1) to manage traffic between multiple clients and manufacturing equipment in a semiconductor manufacturing environment is illustrated. The equipment switch 102 includes a dispatcher 202 that is connected to an equipment agent 204 via an equipment message queue 206. The equipment agent 204 connects the equipment switch 102 to manufacturing equipment (e.g., the manufacturing equipment 112) via a port 236. The dispatcher 202 is also connected to a management information base (MIB) 208, which is connected in turn to a network protocol (e.g., simple network management protocol (SNMP)) agent 210. The dispatcher 202 is also connected to a host agent 212 via a queue 220 and to multiple communication agents 214, 216, and 218 via queues 222, 224, and 226, respectively.

The MIB 208 may store settings for the switch, such as a priority for each message, event subscriptions, communication protocol information, and the size of each message queue 222, 224, 226. The MIB 208 may also store information linking each message queue with a particular port, as will be described later in greater detail.

The SNMP agent 210 may be used to connect the switch to a network (not shown) via a port 220 to monitor network conditions and to enable another device to monitor the equipment switch 102. Using a known protocol such as SNMP enables the equipment switch 102 to be monitored as a network device using known network monitoring devices.

The host agent 212 may connect via a port 228 to a host controlling the manufacturing equipment 112. In the present example, the equipment switch 102 has only the single host agent 212 and is connected to the host only through the port 228. To prevent interruptions in the flow of control messages, the port 228 may be a dedicated port that can only be used by the host controller. In some embodiments, messages received via the port 228 may receive priority over messages received via other ports.

The communication agents 214, 216, 218 may connect to various clients (not shown) via ports 230, 232, 234, respectively. As described with respect to FIG. 1, the clients may include equipment, devices, processes, or other software and hardware components. Each communication agent may enqueue and dequeue messages from their respective queue, may provide synchronous and asynchronous communications with the corresponding client via the associated port, and may be based on different standards (e.g., Component Object Model (COM), Common Object Request Broker Architecture (CORBA), or Simple Object Access Protocol (SOAP)). For purposes of illustration, the clients include the clients 104-110 of FIG. 1 (e.g., the host control process, RMS process, APC process, and FDC process). The equipment switch 102 communicates with the host control process via the port 228, the RMS process via the port 230, the APC process via the port 232, and the FDC process via the port 234.

It is understood that the ports 220, 228, 230, 232, 234, 236 may be physical ports, logical ports, or both. For example, each of the ports 228, 230, 232, 234 may be a physical port that connects directly to a client, or each port may be a logical port that connects to a network via a single physical port (e.g., a $10/100$ Ethernet connection). If a two or more logical ports are associated with a physical port, then the equipment switch 102 may separate messages from a single traffic stream. Furthermore, a logical port may be established for each connection with a client, so a single client may have multiple logical channels through the equipment switch to the manufacturing equipment. In some embodiments, functionality may be provided within the equipment switch 102 to intercept messages received on a single physical port, read message headers, and route the messages to the proper application agent of the corresponding logical port. In other embodiments, this functionality may be provided by the communication agents themselves.

Figure 3:
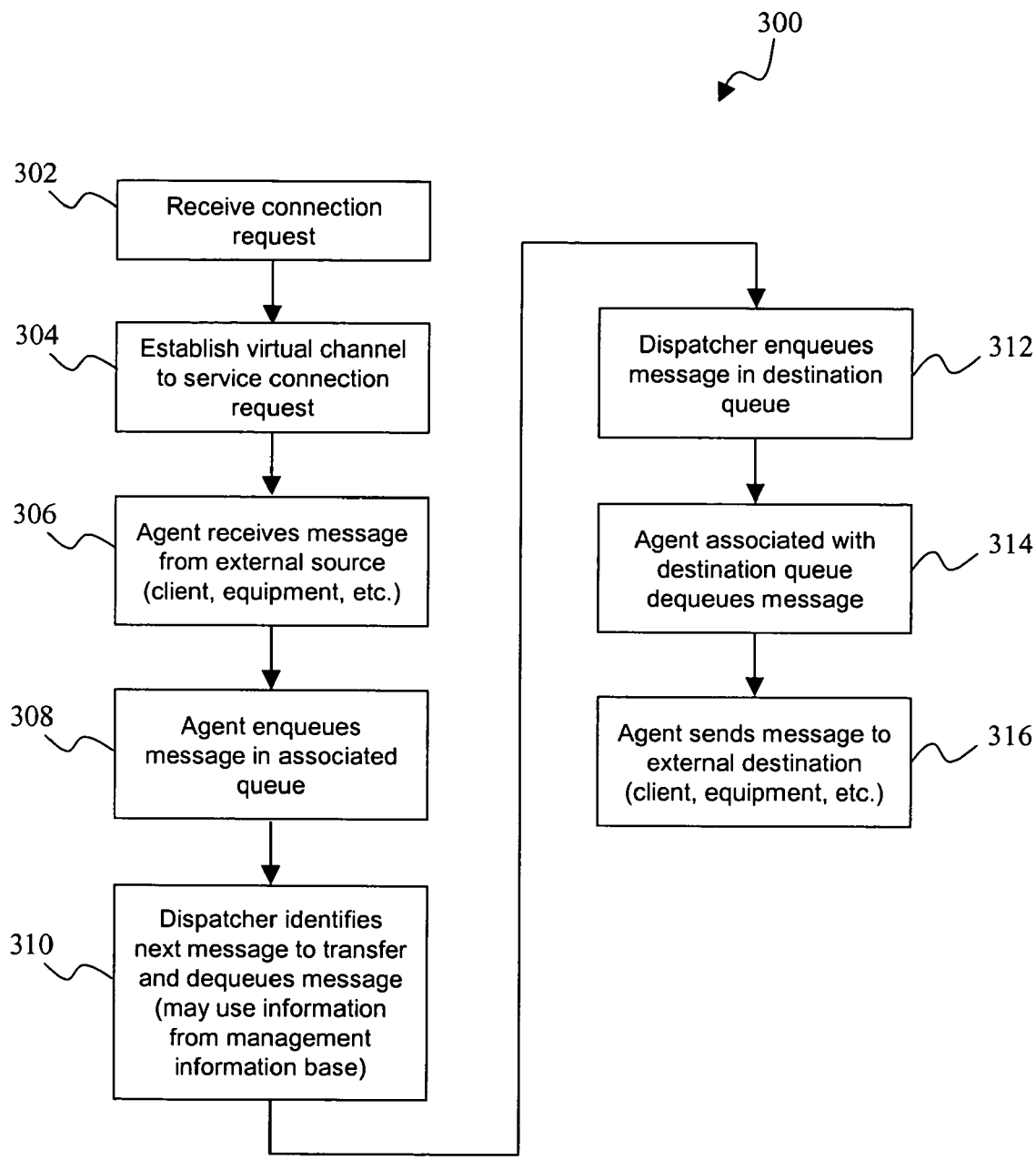
FIG. 3 illustrates a flow chart of an exemplary method that may be executed within the system of FIG. 1.

With additional reference to FIG. 3, in operation, the equipment switch 102 may create multiple virtual channels between the ports 228, 230, 232, 234 and the port 236. Each agent and associated queue may form a single virtual channel, with the messages from each channel being sent by the dispatcher 202 to the equipment message queue 206. Similarly, messages from the equipment message queue may be directed by the dispatcher 202 to the appropriate queue 220, 222, 224, 226.

For purposes of example, the establishment and use of a single virtual channel will be described for the APC process 108 of FIG. 1. In step 302, the equipment switch 102 may receive a connection request from the APC process (or its corresponding client device) to establish the virtual channel. The request may be sent to the equipment switch 102 via the SNMP agent 210 or to another port. For example, if the equipment switch 102 broadcasts a network address/media access control (MAC) number, then the request may be received at a port associated with the network address and MAC number.

In step 304, the equipment switch 102 may establish a virtual channel to service the connection request. For example, the request may be passed on to the MIB 208, which may assign a particular port 232 and communication agent 216 to the client. The assignment may be based on the application agent 216 (e.g., whether the agent is able to communicate with that particular client), message queue size, and similar information. Furthermore, the MIB 208 may determine if the APC process has requested subscription to events (e.g., has requested notification if a particular event occurs). The MIB 208 may also assign a priority level to the virtual channel. For example, messages passing through the virtual channel associated with the host agent 212 may always have a higher level of priority than other messages. The priority may be assigned to each message, to all messages in a virtual channel, to all messages received from or sent to a particular agent or queue, or may be assigned in other ways.

Continuing the current example, the MIB 208 may assign the logical port 232 to the APC process 108. If a logical channel does not exist, the MIB 208 may create such a channel by reserving memory for the queue and performing similar functions. The MIB 208 may then inform the dispatcher 202 of the virtual channel. Alternatively, the dispatcher 202 may query the MIB 208 to determine if a new channel has been established, or the dispatcher 208 may scan a list of predefined queues for messages without querying the MIB 208. A message may then be sent to the client 108 indicating that the client 108 should communicate with the equipment switch 102 via the port 232. It is understood that the client 108 may not know that it is communicating with the equipment switch 102, but may behave as though communicating directly with the equipment 112. This enables the client 108 and equipment 112 to communicate without the need for alterations to either the client 108 or the equipment 112.

In steps 306 and 308, a message may be received from the client 108 by the communication agent 216 and enqueued in the associated queue 224.

In step 310, the dispatcher 202 may identify the next message to be transferred and dequeue the message. The message may be identified in a number of ways. For example, the dispatcher 202 may move sequentially from one queue to the next, servicing a predefined number of messages (or a particular number of bytes). Alternatively, the dispatcher 202 may select messages from a particular queue ahead of messages from other queues based on a predefined priority (e.g., the host queue 220 may always have a higher priority than the other queues). The priority may be indicated by the queue itself, by checking with the MIB 208, or by other means. It is understood that conventional queue techniques may be applied to prevent messages in a queue from never being transferred. For example, even if messages are waiting in the host queue 220, messages in the queue 222 may be transferred if they have aged a predefined amount of time. In some embodiments, only "priority" messages may be transferred first, with other messages in the same queue being handled without a priority basis.

In step 312, the message may be enqueued in the destination queue identified in step 310. In some embodiments, if the message is a priority message, it may be inserted in the queue ahead of other enqueued messages. In other embodiments, the message may be placed in a priority queue (not shown) by the dispatcher 202, with the equipment agent 204 dequeueing messages from the priority queue before the queue 206. In still other embodiments, priority may not affect the enqueuing of messages in the equipment queue 206, and messages may be enqueued and dequeued in the equipment queue 206 sequentially or as defined using other queueing techniques.

In steps 314 and 316, the equipment agent 204 may dequeue the message from the equipment queue 206 and send the message to the equipment 112. Accordingly, a virtual channel may be established between each client and the manufacturing equipment, with messages being routed between the clients and the equipment via their respective virtual channel.

It is understood that a message may be sent from the equipment 112 to a client (e.g., the client 108) in a similar manner. For example, the equipment agent 204 may receive a message from the equipment 212 and enqueue the message in the equipment queue 206. The dispatcher 202 may dequeue the message and identify the client that is the destination. The identification of the destination may be based on the message header, the type of message, the message's protocol, or may be based on other indicators. The dispatcher 202 may then enqueue the message in the destination queue. The agent associated with the queue may then dequeue the message and send it to the client. It is understood that the priority and queueing examples described previously may be applied to messages going from the equipment 112 to the clients 104-110.

Figure 4:
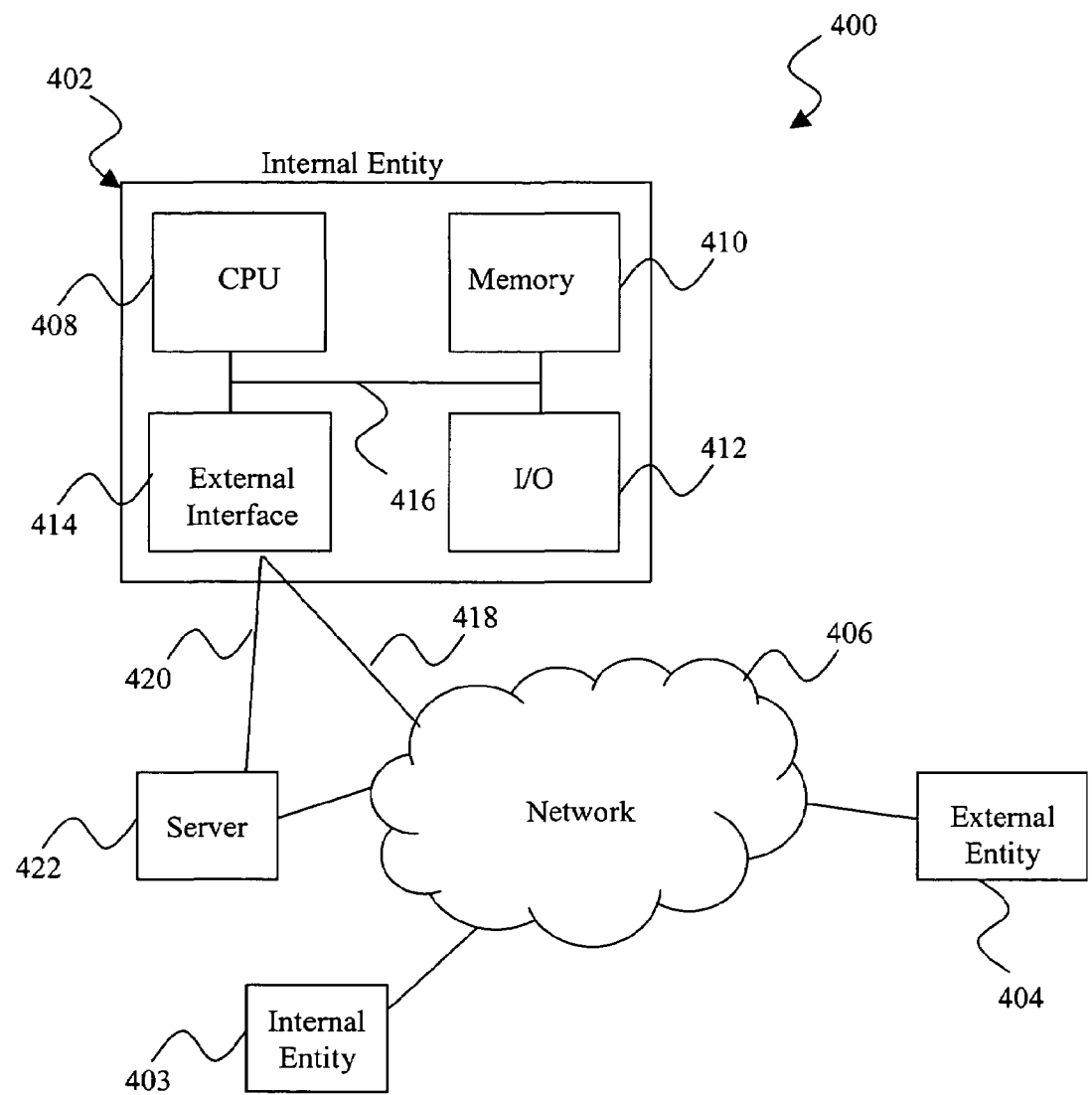
FIG. 4 illustrates a schematic view of a virtual fabrication system within which the system of FIG. 1 may be implemented.

Referring now to FIG. 4, a virtual IC fabrication system (a "virtual fab") 400 provides an exemplary environment within which the equipment switch 102 of FIG. 2 may be implemented. For example, various components of the equipment switch 102 may be included in or represented by the entities of the virtual fab 400. The virtual fab 400 includes a plurality of entities represented by one or more internal entities 402, 403, and one or more external entities 404 that are connected by a communications network 406. The network 406 may be a single network or may be a variety of different networks, such as an intranet and the Internet, and may include both wireline and wireless communication channels.

Each of the entities 402, 404 may include one or more computing devices such as personal computers, personal digital assistants, pagers, cellular telephones, and the like. For the sake of example, the internal entity 402 is expanded to show a central processing unit (CPU) 408, a memory unit 410, an input/output (I/O) device 412, and an external interface 414. The external interface may be, for example, a modem, a wireless transceiver, and/or one or more network interface cards (NICs). The components 408-414 are interconnected by a bus system 416. It is understood that the internal entity 402 may be differently configured and that each of the listed components may actually represent several different components. For example, the CPU 408 may actually represent a multi-processor or a distributed processing system; the memory unit 424 may include different levels of cache memory, main memory, hard disks, and remote storage locations; and the I/O device 412 may include monitors, keyboards, and the like.

The internal entity 402 may be connected to the communications network 406 through a wireless or wired link 418, and/or through an intermediate network 420, which may be further connected to the communications network. The intermediate network 420 may be, for example, a complete network or a subnet of a local area network, a company wide intranet, and/or the Internet. The internal entity 402 may be identified on one or both of the networks 406, 420 by an address or a combination of addresses, such as a MAC address associated with the network interface 414 and an IP address. Because the internal entity 202 may be connected to the intermediate network 420, certain components may, at times, be shared with other internal entities. Therefore, a wide range of flexibility is anticipated in the configuration of the internal entity 402. Furthermore, it is understood that, in some implementations, a server 422 may be provided to support multiple internal entities 402. In other implementations, a combination of one or more servers and computers may together represent a single entity.

In the present example, the internal entities 402 represents those entities that are directly responsible for producing the end product, such as a wafer or individually tested IC devices. Examples of internal entities 402 include an engineer, customer service personnel, an automated system process, a design or fabrication facility and fab-related facilities such as raw-materials, shipping, assembly or test. Examples of external entities 404 include a customer, a design provider, and other facilities that are not directly associated or under the control of the fab. In addition, additional fabs and/or virtual fabs can be included with the internal or external entities. Each entity may interact with other entities and may provide services to and/or receive services from the other entities.

It is understood that the entities 402, 404 may be concentrated at a single location or may be distributed, and that some entities may be incorporated into other entities. In addition, each entity 402, 404 may be associated with system identification information that allows access to information within the system to be controlled based upon authority levels associated with each entities identification information.

The virtual fab 400 enables interaction among the entities 402, 404 for purposes related to IC manufacturing, as well as the provision of services. In the present example, IC manufacturing can include one or more of the following steps:

receiving or modifying a customer's IC order of price, delivery, and/or quantity;

receiving or modifying an IC design;

receiving or modifying a process flow;

receiving or modifying a circuit design;

receiving or modifying a mask change;

receiving or modifying testing parameters;

receiving or modifying assembly parameters; and receiving or modifying shipping of the ICs.

One or more of the services provided by the virtual fab 400 may enable collaboration and information access in such areas as design, engineering, and logistics. For example, in the design area, the customer 404 may be given access to information and tools related to the design of their product via the fab 402. The tools may enable the customer 404 to perform yield enhancement analyses, view layout information, and obtain similar information. In the engineering area, the engineer 402 may collaborate with other engineers 402 using fabrication information regarding pilot yield runs, risk analysis, quality, and reliability. The logistics area may provide the customer 404 with fabrication status, testing results, order handling, and shipping dates. It is understood that these areas are exemplary, and that more or less information may be made available via the virtual fab 400 as desired.

Another service provided by the virtual fab 400 may integrate systems between facilities, such as between a facility 404 and the fab facility 402. Such integration enables facilities to coordinate their activities. For example, integrating the design facility 404 and the fab facility 402 may enable design information to be incorporated more efficiently into the fabrication process, and may enable data from the fabrication process to be returned to the design facility 404 for evaluation and incorporation into later versions of an IC.

In the present example, the internal entity 402 may represent the equipment switch 102 (FIGS. 1 and 2) and the internal entity 403 may represent the manufacturing equipment 112 (FIG. 1). The network 406 may connect the equipment switch 102 with a plurality of clients (not shown) as described with respect to FIGS. 1 and 2. As described previously, the clients and equipment may communicate via the equipment switch 102 as previously described. Furthermore, components of the equipment switch 102 may be distributed within the virtual fab 400.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A system for connecting semiconductor manufacturing equipment to a host and at least a first client via virtual channels, the system comprising:

a first application agent, a host agent, and an equipment agent configured to communicate with the first client, the host, and the manufacturing equipment, respectively;

a first application queue, a host queue, and an equipment queue configured to hold messages received from and sent to the first application agent, the host agent, and the equipment agent, respectively;

a management information base configured to store information identifying a first virtual channel linking the first client with the manufacturing equipment via the first application queue and the equipment queue, and a second virtual channel linking the host with the manufacturing equipment via the host queue and the equipment queue; and a dispatcher configured to use the information from the management information base to route messages between the first client and the manufacturing equipment via the first virtual channel and to route messages between the host and the manufacturing equipment via the second virtual channel.

2. The system of claim 1 further comprising a protocol agent positioned between the management information base and a network, wherein the system may be monitored as a network device using a network agent.

3. The system of claim 1 further comprising a second application agent and a second application queue, wherein the management information base is further configured to store information identifying a third virtual channel linking a second client with the manufacturing equipment via the second application queue and the equipment queue.

4. The system of claim 3 wherein the first and second application agents communicate using different protocols.

5. The system of claim 1 wherein the first application queue further comprises an inbound portion and an outbound portion, wherein messages destined for the first application agent via the first virtual channel are stored in the inbound portion, and wherein messages sent by the first application agent via the first virtual channel are stored in the outbound portion.

6. The system of claim 5 wherein the host queue further comprises an inbound portion and an outbound portion, wherein messages destined for the host agent via the second virtual channel are stored in the inbound portion, and wherein messages sent by the host agent via the second virtual channel are stored in the outbound portion.

7. The system of claim 6 wherein the equipment queue further comprises an inbound portion and an outbound portion, wherein messages destined for the equipment agent via the first and second virtual channels are stored in the inbound portion, and wherein messages sent by the equipment agent via the first and second virtual channels are stored in the outbound portion.

8. The system of claim 1 further comprising at least one memory for storing instructions for at least one of the application agent, the host agent, the equipment agent, and the dispatcher.

9. The system of claim 1 further comprising:

at least one processor for executing software instructions;

at least one computer readable medium for storing the instructions, the instructions including instructions for assigning a higher priority to messages transferred via the second virtual channel than to messages transferred via the first virtual channel, wherein the higher priority causes the messages in the second virtual channel to be handled by the dispatcher before the messages in the first virtual channel.

10. The system of claim 9 further comprising instructions for registering the first client for an event, wherein the first client will be notified when the event occurs.

11. A computer readable medium having stored thereon a sequence of instructions which, when executed by a computer, causes the computer to perform a method for simultaneously connecting semiconductor manufacturing equipment having a single communication port to a plurality of clients, the method comprising:

receiving a first message, by a communication agent, from one of the plurality of clients;

enqueuing, by a first agent, the first message in a communication queue associated with the communication agent;

identifying the first message as a next message to transfer by a dispatcher;

dequeuing, by the dispatcher, the first message from the communication queue and enqueueing the first message in an equipment queue associated with the manufacturing equipment; and dequeueing the first message, by an equipment agent, from the equipment queue and sending the first message to the manufacturing equipment.

12. The method of claim 11 further comprising:

receiving a second message, by the equipment agent, from the manufacturing equipment;

enqueuing, by the equipment agent, the second message in the equipment queue;

identifying a destination for the message by the dispatcher, wherein the destination is one of the plurality of clients;

dequeuing, by the dispatcher, the second message from the equipment queue and enqueueing the second message in a communication queue corresponding to the destination client;

dequeueing the second message, by a second agent, from the equipment queue and sending the second message to the manufacturing equipment.

13. The method of claim 12 further comprising identifying, by the dispatcher, a priority of each of the first and second messages.

14. The method of claim 12 further comprising accessing a management information base, by the dispatcher, to identify the destination client.

15. The method of claim 11 further comprising:

receiving a connection request from one of the plurality of clients; and establishing a virtual channel between the client and the manufacturing equipment in response to the connection request.

16. The method of claim 15 wherein establishing the virtual channel includes:

identifying a communication agent having a communication protocol compatible with the client;

storing information linking the communication agent with the client; and sending a response message to the client, wherein the response message instructs the client to communicate with the manufacturing equipment via a port associated with the communication agent.

17. The method of claim 11 further comprising sending and receiving network monitoring messages to verify that the client and the manufacturing equipment are able to communicate.

18. The method of claim 11 further comprising:

receiving a request for subscribing to an event from one of the plurality of clients; and notifying the client when the event occurs.

* * * * *